United States Patent
Yen et al.

(10) Patent No.: US 11,887,365 B2
(45) Date of Patent: Jan. 30, 2024

(54) METHOD FOR PRODUCING AND REPLAYING COURSES BASED ON VIRTUAL REALITY AND SYSTEM THEREOF

(71) Applicant: Delta Electronics, Inc., Taoyuan (TW)

(72) Inventors: Yao-Han Yen, Taoyuan (TW); Wen-Hsin Lo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 257 days.

(21) Appl. No.: 17/138,058

(22) Filed: Dec. 30, 2020

(65) Prior Publication Data

US 2021/0394046 A1 Dec. 23, 2021

Related U.S. Application Data

(60) Provisional application No. 63/040,215, filed on Jun. 17, 2020.

(51) Int. Cl.
| | | |
|---|---|---|
| *A63F 13/45* | (2014.01) | |
| *G06V 20/20* | (2022.01) | |
| *A63F 13/212* | (2014.01) | |
| *G02B 27/01* | (2006.01) | |
| *G06F 18/24* | (2023.01) | |

(52) U.S. Cl.
CPC ............ *G06V 20/20* (2022.01); *A63F 13/212* (2014.09); *A63F 13/45* (2014.09); *G02B 27/0172* (2013.01); *G06F 18/24* (2023.01)

(58) Field of Classification Search
CPC ... A63F 13/212; A63F 13/45; G02B 27/0172; G06V 20/20; G06T 19/00; G06T 13/20
See application file for complete search history.

(56) References Cited

U.S. PATENT DOCUMENTS

| | | | |
|---|---|---|---|
| 8,225,226 B2 * | 7/2012 | Skourup ................. | G06F 3/011 |
| | | | 700/259 |
| 9,616,338 B1 * | 4/2017 | Hooper ................... | G06F 3/016 |
| | (Continued) | | |

FOREIGN PATENT DOCUMENTS

| | | |
|---|---|---|
| CN | 108646926 B | 12/2018 |
| TW | 201334771 A | 9/2013 |
| TW | M-549381 U | 9/2017 |

OTHER PUBLICATIONS

Office Action dated Dec. 10, 2021 in TW Application No. 110101534, 20 pages.

*Primary Examiner* — David L Lewis
*Assistant Examiner* — Shauna-Kay Hall
(74) *Attorney, Agent, or Firm* — Muncy, Geissler, Olds & Lowe, P.C.

(57) ABSTRACT

A method for producing and replaying courses based on virtual reality is provided. The method is used in an electronic device and the method includes steps of: receiving a 3D model; generating a model data package corresponding to the 3D model according to the 3D model, wherein the model data package at least includes several objects applied to the 3D model; recording, by several virtual cameras, actions of a user who manipulates the objects in virtual reality, and generating action videos corresponding to the objects; and generating a course data package, wherein the course data package includes the model data package and an animation package including action videos.

18 Claims, 13 Drawing Sheets

(56) References Cited

U.S. PATENT DOCUMENTS

| | | | | |
|---|---|---|---|---|
| 11,567,572 B1* | 1/2023 | Pratt | ............... | G06F 3/011 |
| 2007/0248261 A1* | 10/2007 | Zhou | ............... | G06T 19/006 |
| | | | | 382/154 |
| 2008/0162261 A1* | 7/2008 | Velazquez | ............... | G06F 3/011 |
| | | | | 715/757 |
| 2012/0280988 A1* | 11/2012 | Lampotang | ............... | G09B 23/285 |
| | | | | 434/262 |
| 2013/0182070 A1* | 7/2013 | Peters | ............... | G09B 19/24 |
| | | | | 348/43 |
| 2013/0187930 A1* | 7/2013 | Millman | ............... | G06T 19/00 |
| | | | | 345/473 |
| 2014/0162224 A1* | 6/2014 | Wallace | ............... | G09B 5/06 |
| | | | | 434/219 |
| 2016/0071318 A1* | 3/2016 | Lee | ............... | G06V 20/653 |
| | | | | 345/419 |
| 2016/0257000 A1* | 9/2016 | Guerin | ............... | B25J 9/1671 |
| 2017/0323483 A1* | 11/2017 | Palmaro | ............... | G06T 19/20 |
| 2018/0018826 A1* | 1/2018 | Maier | ............... | G06T 19/006 |
| 2018/0218538 A1* | 8/2018 | Short | ............... | G06T 7/73 |
| 2018/0234676 A1* | 8/2018 | Cole | ............... | H04N 13/275 |
| 2018/0357823 A1* | 12/2018 | Koniki | ............... | G09B 5/02 |
| 2019/0199993 A1* | 6/2019 | Babu J D | ............... | G06F 3/011 |
| 2020/0066049 A1* | 2/2020 | Sun | ............... | G06Q 10/10 |
| 2020/0202737 A1* | 6/2020 | Aiyer | ............... | G06T 19/20 |
| 2020/0234487 A1* | 7/2020 | Clapp | ............... | G06T 1/60 |

\* cited by examiner

METHOD FOR PRODUCING AND REPLAYING COURSES BASED ON VIRTUAL REALITY AND SYSTEM THEREOF

CROSS REFERENCE TO RELATED APPLICATIONS

This application claims priority to U.S. Provisional Application Ser. No. 63/040,215, filed on Jun. 17, 2020, the entire of which is incorporated by reference herein.

BACKGROUND

Technical Field

The present disclosure generally relates to a method for producing and replaying courses and system thereof. More specifically, aspects of the present disclosure relate to a method for producing and replaying courses based on virtual reality and system thereof.

Description of the Related Art

In the emerging multimedia teaching mode, virtual reality (VR) teaching materials and VR content editors developed with VR technology can present an immersive simulated real working environment like on-site, and have been applied such as large-scale machine operation, industrial safety incident drills, and simulation of human physiological phenomena. However, the production of this type of teaching materials and courses requires higher skills. It must be completed by professional engineers, 2D/3D artists, and teaching designers for script design, 3D model creation, and VR realistic interactive settings. Furthermore, the VR content editors on the market have complicated functions. Users need to spend a lot of time and even need basic programming knowledge to operate the VR content editors. For lecturers who simply want to train students in technical operations, they cannot design and produce teaching materials efficiently. In addition, there are also some solutions for recording VR teaching materials for students to watch by recording the teaching process as a video. However, the film only has one perspective for students to watch, and students cannot watch the teaching process from all perspectives, so students may not be able to understand the teaching process.

Therefore, there is a need for a method for producing and replaying courses based on virtual reality and system thereof to solve above-mentioned problems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method for producing and replaying courses based on virtual reality and system thereof to overcome above-mentioned disadvantages.

In an exemplary embodiment, a method for producing and replaying courses based on virtual reality, the method used in an electronic device, including steps of: receiving a 3D model; generating a model data package corresponding to the 3D model according to the 3D model, wherein the model data package at least includes several objects applied to the 3D model; recording, by several virtual cameras, actions of a user who manipulates the objects in virtual reality, and generating action videos corresponding to the objects; and generating a course data package, wherein the course data package includes the model data package and an animation package including action videos.

In some embodiments, the objects are classified into pure collision objects, base objects, extraction objects, physical objects, penetrating objects, and physical objects with gravity ignored.

In some embodiments, the virtual cameras record coordinate rotation information and displacement information of the objects through a time difference.

In some embodiments, after recording the actions of the user who manipulates the objects in virtual reality, the method further includes: determining whether the objects move; marking the action videos with time stamps when an object moves; and storing the action videos marked with time stamps.

In some embodiments, the method further includes steps of: loading the course data package; and playing the animation package included in the course data package to replay the actions of the user manipulating the objects in virtual reality.

In some embodiments, the step of playing the animation package included in the course data package further including steps of: putting the animation package including the action videos into an object pool; determining whether an action frame of the action videos has the same first object as an action frame to be played; and reserving the first object of the action frame in the object pool when the action frame and the action frame to be played have the same first object.

In some embodiments, the method further includes a step of: creating virtual reality with a Unity3D engine.

In some embodiments, the course data package is an AssetBundle file.

In some embodiments, the animation package includes at least one audio file, a preloaded object-and-animation matching file, animation information corresponding to the objects, a screenshot of the animation package or combination thereof.

In some embodiments, the electronic device is a head-mounted display (HMD) device.

In an exemplary embodiment, a system for producing and replaying courses based on virtual reality, including: one or more processors; and one or more computer storage media for storing one or more computer-readable instructions, wherein the processor is configured to drive the computer storage media to execute the following tasks: receiving a 3D model; generating a model data package corresponding to the 3D model according to the 3D model, wherein the model data package at least includes several objects applied to the 3D model; recording, by several virtual cameras, actions of a user who manipulates the objects in virtual reality, and generating action videos corresponding to the objects; and generating a course data package, wherein the course data package includes the model data package and an animation package including action videos.

BRIEF DESCRIPTION OF DRAWINGS

The accompanying drawings are included to provide a better understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more hilly below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1B:
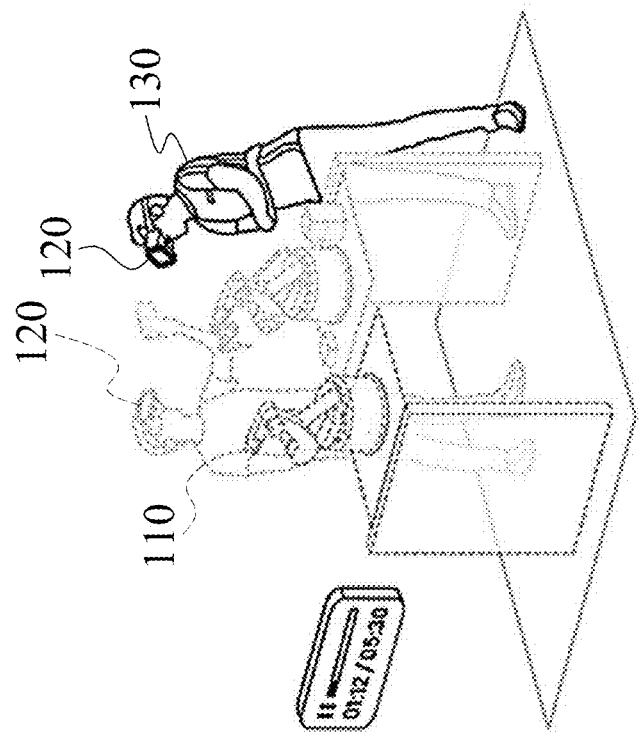
FIG. 1B is a schematic diagram illustrating a learner wearing an HMD device watching virtual-reality teaching materials in virtual reality according to an embodiment of the present disclosure.
Figure 1A:
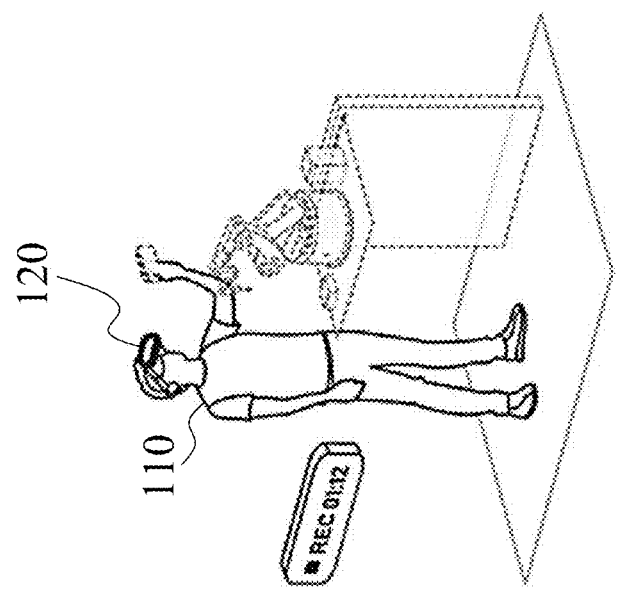
FIG. 1A is a schematic diagram illustrating the teacher wearing a head-mounted display (HMD) device manipulating virtual-reality teaching materials in virtual reality according to an embodiment of the present disclosure.

FIG. 1A is a schematic diagram illustrating the teacher 110 wearing a head-mounted display (HMD) device 120 manipulating virtual-reality teaching materials in virtual reality according to an embodiment of the present disclosure.

In FIG. 1A, the teacher 110 may convert real hand operation actions into virtual 3D videos by using the method for producing and replaying courses based on virtual reality and system thereof proposed in this disclosure, so that the teacher 110 may record actions while operating in virtual reality. The teacher 110 may create a virtual-reality course through the HMD device 120. The HMD device 120 may transmit data to a computing device (not shown in the FIG. 1A) or receive data from the computing device via a wired network or wireless communication. The HMD device 120 and the computing device may respectively include a processor and a memory capable of storing programs.

The types of computing devices range from small handheld devices (for example, mobile phones/portable computers) to large host systems (for example, large computers). Examples of portable computers include personal digital assistants (PDAs), notebook computers and other devices. In another embodiment, the computing device may be used with other components, systems, subsystems, and/or devices beyond those described herein. For example, the computing device may be integrated with the HMD device 120 into one device.

FIG. 1B is a schematic diagram illustrating a learner 130 wearing an HMD device 120 watching virtual-reality teaching materials in virtual reality according to an embodiment of the present disclosure. The learner 130 may first receive the virtual-reality teaching material recorded by the teacher 110 through the HMD device 120, and simultaneously watch the operation actions the teacher 110 of the virtual 3D videos in virtual reality by using the method for producing and replaying courses based on virtual reality and system thereof proposed in this disclosure. In addition, the learner 130 may freely explore from multiple angles or follow the operation steps of the teacher 110 to operate together.

Figure 13:
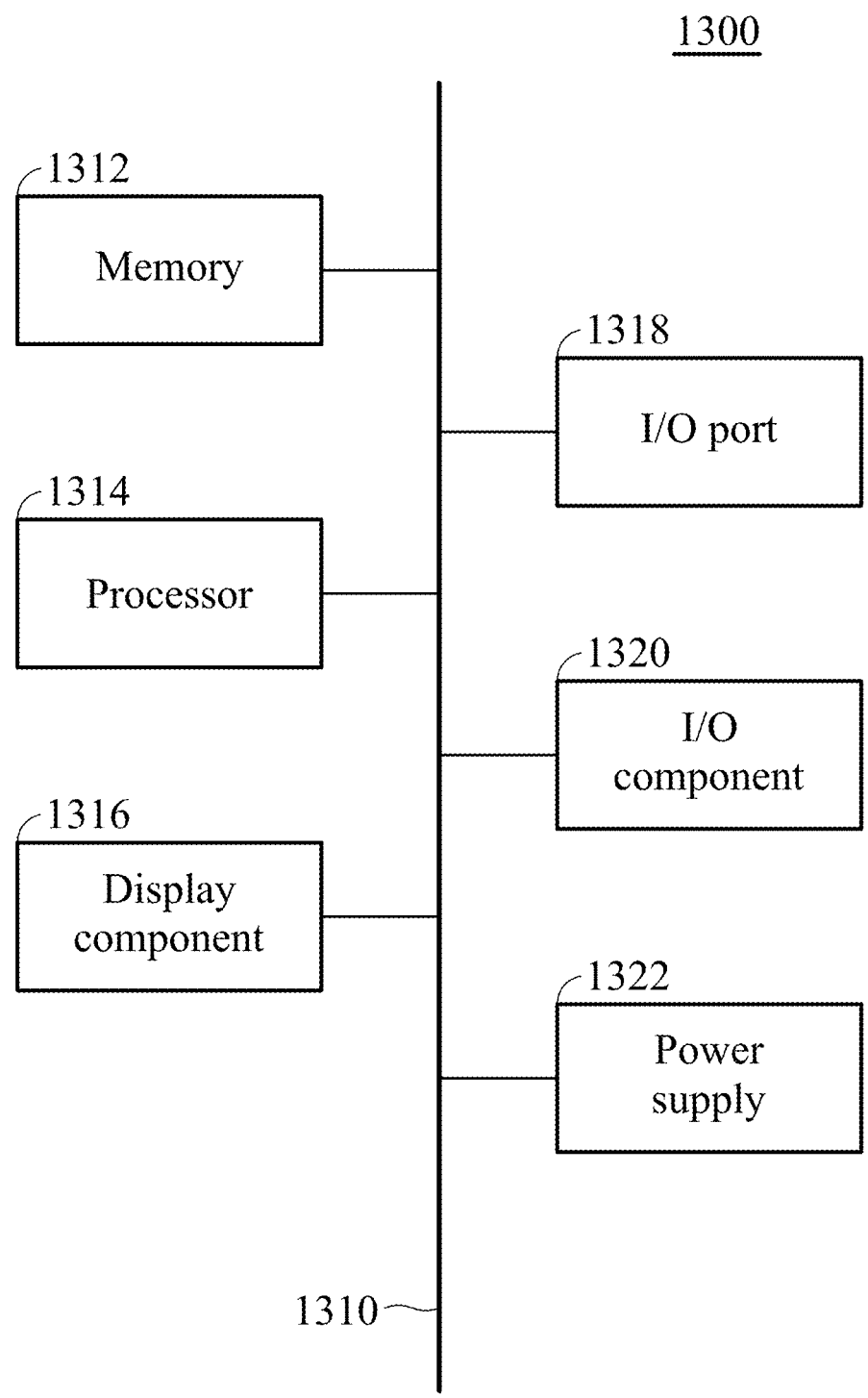
FIG. 13 illustrates an exemplary operating environment for implementing embodiments of the present disclosure.

It should be understood that the HMD device 120 and the computing device 130 shown in FIG. 1A and FIG. 1B can be implemented via any type of computing device, such as the computing device 1300 described with reference to FIG. 13, as shown in FIG. 13.

In order to allow a user entering a virtual-reality environment to directly start the operation of course production, it is necessary to simulate the physical characteristics of the real world as much as possible in virtual reality, so as to avoid making users feel confused because of some physical characteristics that violate real-world conditions, resulting in low user willingness to operate. The method for producing and replaying courses based on virtual reality and a system thereof as provided in this disclosure are designed with six types of object characteristics, which the user feels are in accordance with real-world experience during operation even though the objects do not completely conform to real physical nature. The following is an example of assembling a 3D model, wherein the 3D model is a machine.

In order to simulate the physical effects of assembling a machine in the real world in virtual reality, the built-in 3D physics in a Unity3D engine is adopted in the disclosure, wherein the Unity3D engine mainly uses the open source Nvidia PhysX physics engine integration to assist various simulations in development, such as rigid bodies, collisions, joint simulations, and role controllers. In the present disclosure, the objects that make up the 3D model are divided into six different types of objects, namely pure collision objects, base objects, extraction objects, physical objects, penetrating objects, and physical objects with gravity ignored. Each object has a different physical effect, as shown in TABLE 1.

TABLE 1

| | Object type | | | | | |
|---|---|---|---|---|---|---|
| | Movable | | | Not movable | | |
| | Physical object | Physical objects with gravity ignored | Penetrating object | Base object | Extraction objects (VR controllers) | Pure collision object (Table) |
| Collision effect | Y | Y | N | Y | N | Y |
| Gravity effect | Y | N | N | N | N | N |
| Penetrate effect | N | N | Y | N | Y | N |
| Grouping effect | Y | N | N | N | N | N |
| Grabbable effect | Y | Y | Y | N | N | N |

The effect of each type of objects in contact with each other is shown in TABLE 2.

TABLE 2

| | Object A | | | | | |
|---|---|---|---|---|---|---|
| Object B | Assembly component (physical objects) | Hand tool (Physical objects with gravity ignored) | Marked objects (penetrating objects) | Cabinet (base object) | Virtual reality controller (extract objects) | Other (pure collision objects) |
| Assembly component (physical objects) | Collision and no penetration effect. Determine whether the two objects have a clustering effect according to the level, and their clustering can also be cancelled. | Collision and no penetration effect. | Penetration | Object B is fixed, and the gravity effect of object B is cancelled. When the next physical object is in series with object B, it will be fixed and the clustering effect is lost, and so on. | Penetration. Object B can be extracted. | Collision and no penetration effect. |
| Hand tool (Physical objects with gravity ignored) | Collision and no penetration effect. | Collision and no penetration effect. | Penetration | Collision and no penetration effect. | Penetration. Object B can be extracted. | Collision and no penetration effect. |
| Marked objects (penetrating objects) | Penetration | Penetration | Penetration | Penetration | Penetration. Object B can be extracted. | Penetration |

TABLE 2-continued

| | | | Object A | | | |
|---|---|---|---|---|---|---|
| Object B | Assembly component (physical objects) | Hand tool (Physical objects with gravity ignored) | Marked objects (penetrating objects) | Cabinet (base object) | Virtual reality controller (extract objects) | Other (pure collision objects) |
| Cabinet (base object) | Object A is fixed, and the gravity effect of object A is cancelled. When the next physical object is in series with object A, it will be fixed and the clustering effect is lost, and so on. | Collision and no penetration effect. | Penetration | Both cannot move, so there is no possibility of collision | Penetration. Object B cannot be extracted. | Both cannot move, so there is no possibility of collision |
| Virtual reality controller (extract objects) | Penetration. Object A can be extracted. | Penetration. Object A can be extracted. | Penetration. Object A can be extracted. | Penetration. Object A cannot be extracted. | No reaction | Penetration. Object A cannot be extracted. |
| Other (pure collision objects) | Collision and no penetration effect. | Collision and no penetration effect. | Penetration | Both cannot move, so there is no possibility of collision | Penetration. Object B cannot be extracted. | Both cannot move, so there is no possibility of collision |

Figure 2:
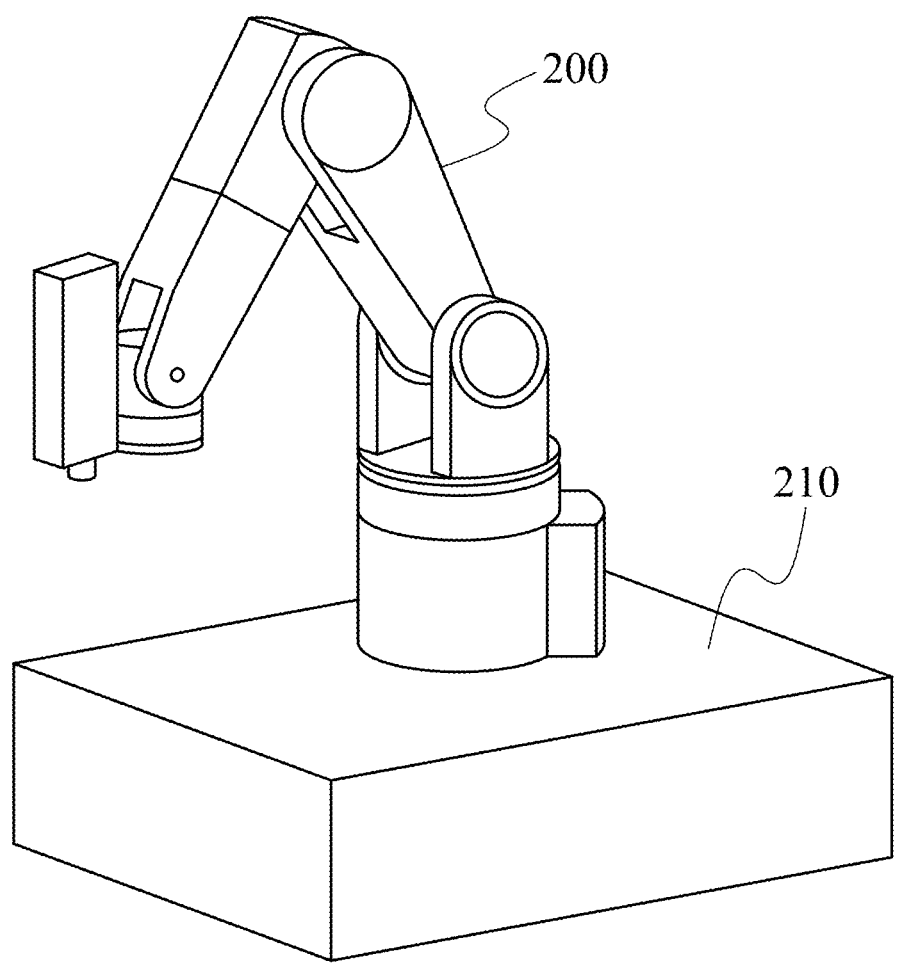
FIG. 2 is a schematic diagram illustrating the preparation of the base object according to an embodiment of the present disclosure.

In order to construct a correct and realistic assembly simulation in virtual reality, the conditions for defining the assembly base must also be met in addition to adjusting the built-in parameters. When the object is assembled, it is often encountered that the object to be assembled has been placed in the target position, but the object to be assembled is collided or turned by other objects. The above situation will affect the assembly result. Therefore, the conditions of the base object is designed in the present disclosure, so that the user must use an object as the assembly base when assembling objects in virtual reality, wherein objects in contact with the base inherit the characteristics of the base object and enter the fixed mode. FIG. 2 is a schematic diagram illustrating the preparation of the base object according to an embodiment of the present disclosure. As shown in FIG. 2, the user can set the cabinet part 210 as the base for the assembly of the whole machine 200. The mechanical arm, electric lock plate, and electric lock module in contact with the base are fixed.

Figure 3:
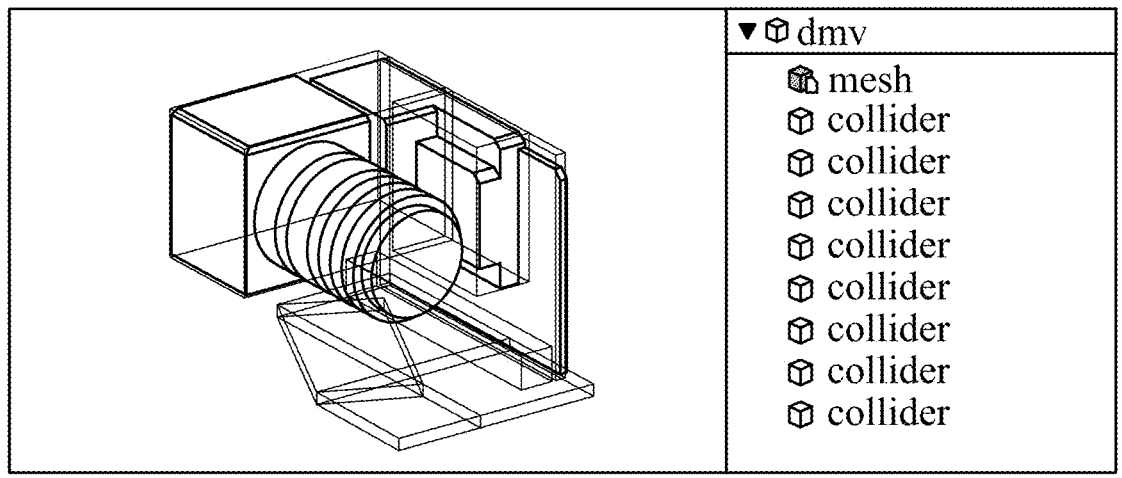
FIG. 3 is a schematic diagram illustrating the definition of collision objects according to an embodiment of the present disclosure.

FIG. 3 is a schematic diagram illustrating the definition of collision objects according to an embodiment of the present disclosure. In order to simulate the real collision effect of objects in virtual reality and reduce energy consumption of the calculations performed by the Unity3D engine, the user may set the collision range of each object through the physical collider in the Unity3D engine when assembling each object to simulate the real virtual reality.

Figure 4:
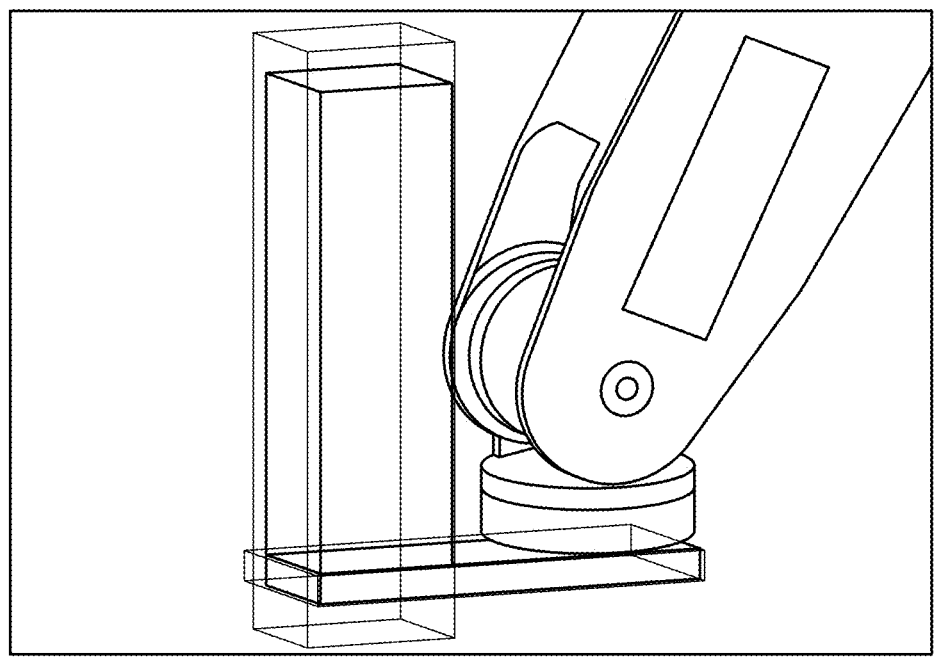
FIG. 4 is a schematic diagram illustrating the definition of cluster objects according to an embodiment of the present disclosure.

FIG. 4 is a schematic diagram illustrating the definition of cluster objects according to an embodiment of the present disclosure. In order to meet the actual assembly requirements of users, users may perform actions such as assembling and disassembling objects according to their own needs during the assembly process. The user may determine which object has the function of pulling the other object in real time according to the mass or volume of the two objects. In the process of assembling two objects, users may use the fixed joint function in the Unity3D engine to move an object and assemble it on other objects. Specifically, the process of assembling the two objects is similar to forming the two objects into a parenting object. According to the characteristics of a parenting object, the user may easily disassemble and reassemble the objects.

Figure 5:
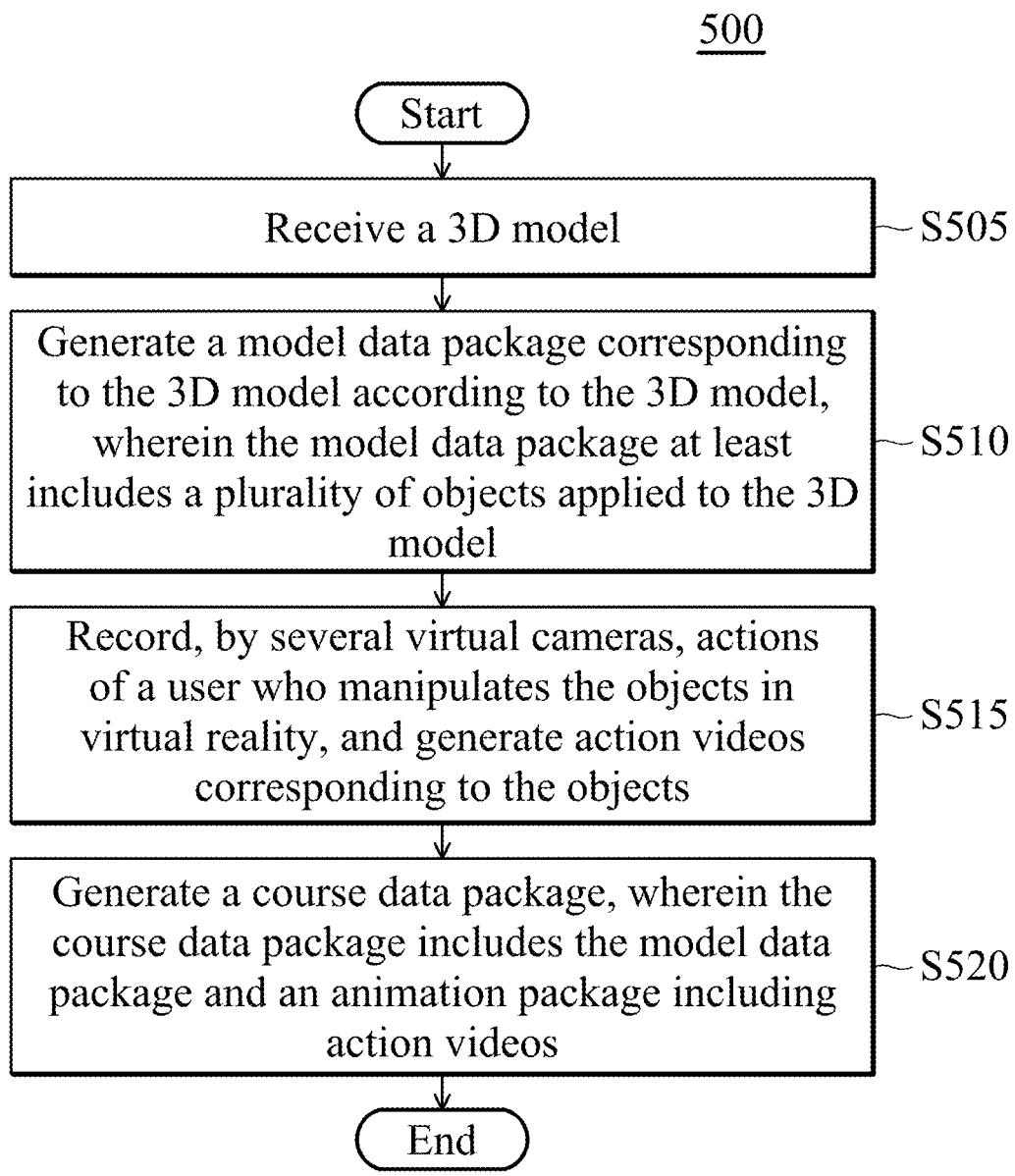
FIG. 5 is a flowchart illustrating a method for producing and replaying courses based on virtual reality according to an embodiment of the present disclosure.

FIG. 5 is a flowchart 500 illustrating a method for producing and replaying courses based on virtual reality according to an embodiment of the present disclosure. The method may be implemented in an electronic device similar to the HMD device 120 or the computing device 130 as shown in FIG. 1.

In step S505, the electronic device receives a 3D model.

In step S510, the electronic device generates a model data package corresponding to the 3D model according to the 3D model, wherein the model data package at least includes several objects applied to the 3D model. In one embodiment, the objects are classified into pure collision objects, base objects, extraction objects, physical objects, penetrating objects, and physical objects with gravity ignored.

Figure 6:
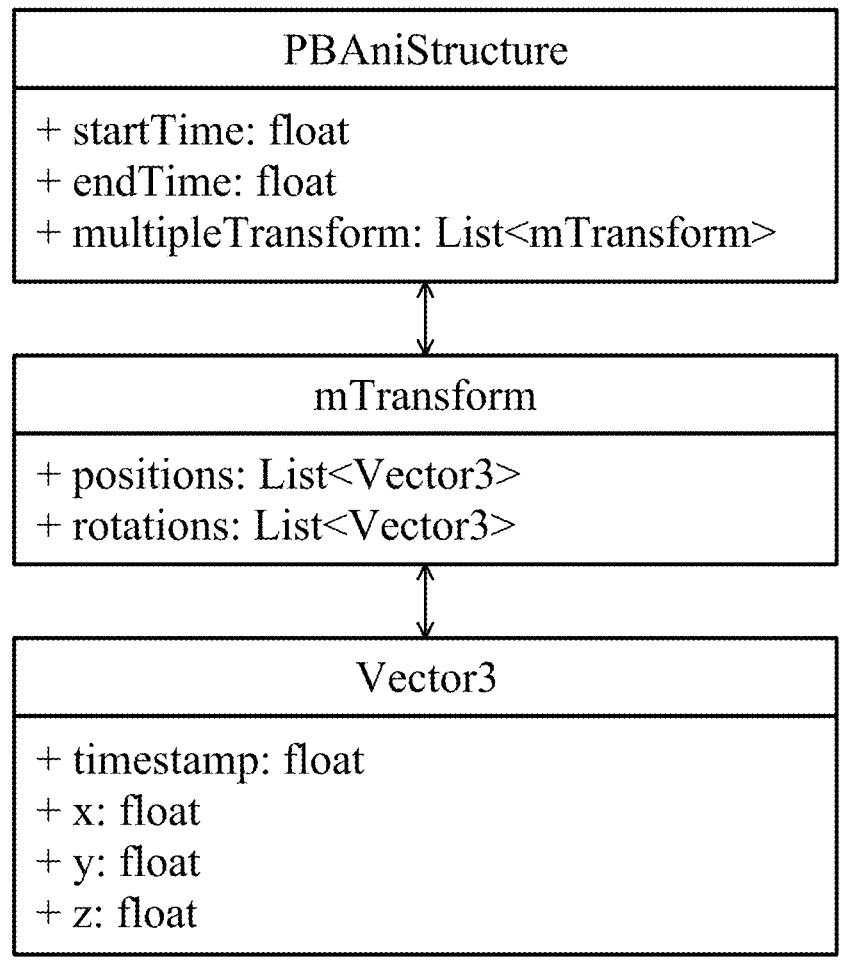
FIG. 6 is a schematic diagram illustrating the unified modeling language (UML) of the virtual camera recording the movement of the object according to an embodiment of the present disclosure.

Next, in step S515, the electronic device uses several virtual cameras to record actions of a user who manipulates the objects in virtual reality, and generates action videos corresponding to the objects, wherein the virtual cameras record coordinate rotation information and displacement information of the objects through a time difference. In one embodiment, the time difference is 10 milliseconds (ms). In another embodiment, the user may set up a corresponding virtual camera on each object to record the movement of each object. FIG. 6 is a schematic diagram illustrating the unified modeling language (UML) of the virtual camera recording the movement of the object according to an embodiment of the present disclosure.

In step S520, the electronic device generates a course data package, wherein the course data package includes the model data package and an animation package including action videos.

Specifically, the course data package generated by the electronic device contains all the multimedia files needed in the course, such as images, 3D models, audio files, etc. Each file is categorized according to type and attribute to facilitate maintenance. The course data package is shown in TABLE 3.

TABLE 3

| GUID | Name | Type | Remark |
|---|---|---|---|
| 22df614a-9d80-445a-8615-bf1c1a6d59e5 | | | |
| └ | assets | | |
| | └ | images | This folder contains all the dynamic loaded pictures of the course, such as hand tool icons, marking object icons, etc. |
| | └ | AssetBundles | This folder contains the model files needed in the course. |
| | └ | jsons | The folder defines the physical property models that need to be loaded in the course, and the selection of hand tools and marked tools, etc. |
| | clips | | This folder contains all recorded animation packages |
| | └ | . . . | |
| | clipset | | This folder is the final edited and exported recording file of the editor |
| | └ | . . . | |

In one embodiment, the course data package including the action videos is an AssetBundle file. Specifically, the action videos and 3D model generated in step S515 may be imported into the assets of the Unity3D engine, so that the action videos and 3D model are packaged into the AssetBundle foil tat. The AssetBundle function may translate various 3D file formats (for example: .FBX, .obj, .gltf, .stl, etc.) to achieve the effect of saving model space.

The animation package included in the course data package at least includes an audio file (.wav), a preloaded object and animation matching file (.json), animation information corresponding to the object (.pbani), and a screenshot of animation package (.jpg). The detailed content of the animation package is shown in TABLE 4.

TABLE 4

| GUID | Name | Type | Remark |
|---|---|---|---|
| 22df614a-9d80-445a-8615-bf1c1a6d59e5 | | | |
| └ | 3db1289e-cc10-4833-9e65-f925f24243af | .pbani | The file records the offset formed by a single object in a time period |
| └ | c874b3ae-d832-4f3c-8813-d800790df959 | .pbani | Same as above |
| └ | cad93f18-62b7-454c-b3cf-29933c42f631 | .pbani | Same as above |
| └ | Narration | .wav | Voice narration of editor during course creation |
| └ | structure | .jsons | 3D model pre-loaded in the animation package and .pbani corresponding information |
| └ | thumbnail | .jpg | Screenshot of the animation package |

Figure 7:
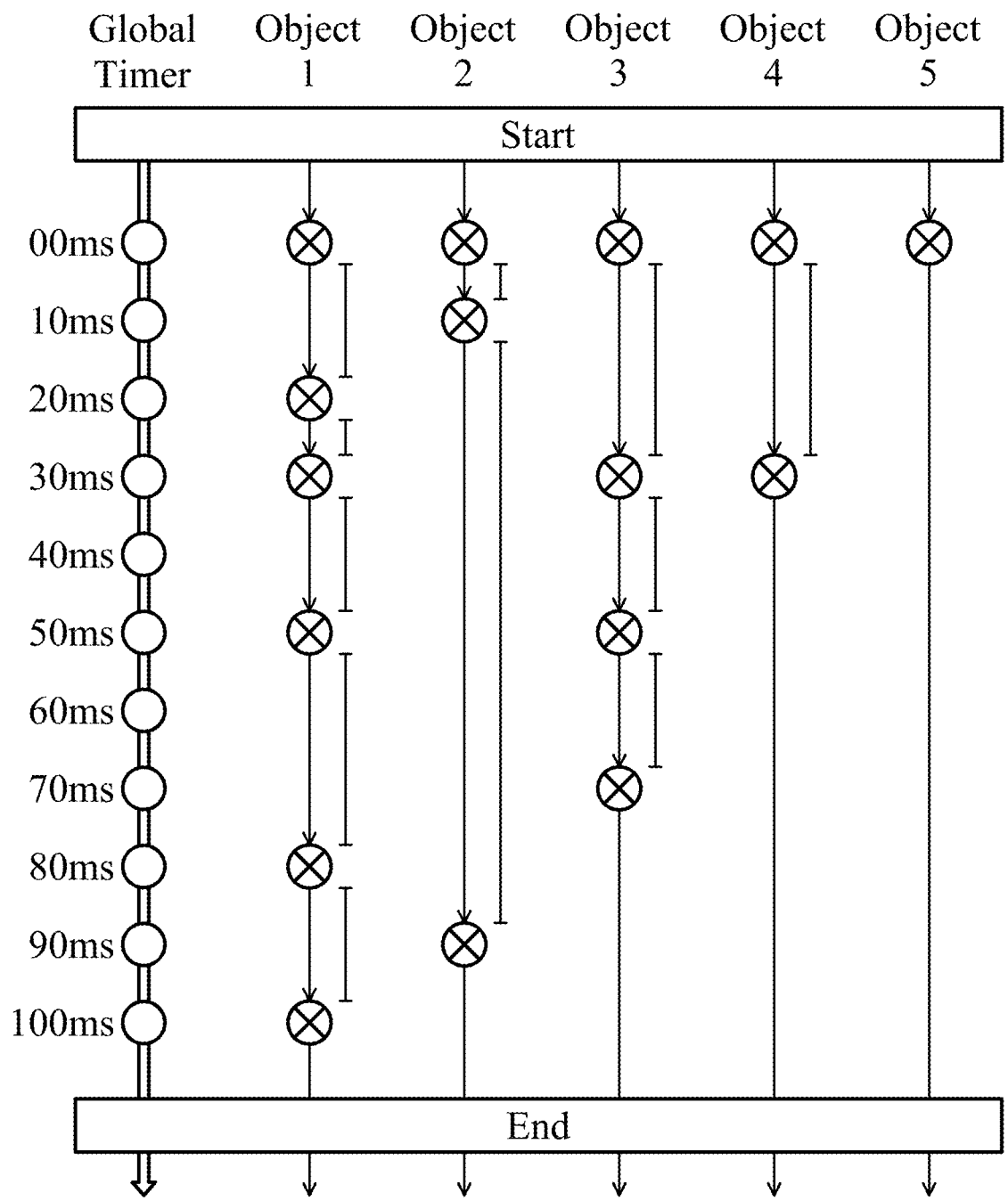
FIG. 7 is a schematic diagram illustrating the electronic device marking the action videos with the time stamps according to an embodiment of the disclosure.

In one embodiment, after step S515, the electronic device may further determine whether an object moves. When an object moves, the electronic device marks the action videos with time stamps, and only stores the action videos marked with time stamps. FIG. 7 is a schematic diagram illustrating the electronic device marking the action videos with the time stamps according to an embodiment of the disclosure. It is assumed that the 3D model has five objects, namely Object 1 to Object 5. The virtual cameras that record the movements of Object 1 to Object 5 may record the coordinate rotation information and displacement information of Object 1 to Object 5 through a time difference (10 ms). As shown in the FIG. 5, the electronic device may further determine whether the Object 1 to Object 5 move. When Object 1 to Object 5 move, the electronic device marks the action videos with a time stamp (symbol ⊕), and records the coordinate rotation information and displacement information of the Object 1 to Object 5 at this time stamp. For example, the electronic device determines that the Object 1 has moved at the time points of 00 ms, 20 ms, 30 ms, 50 ms, 80 ms, and 100 ms respectively. The electronic device adds the time stamps to the action video of the Object 1 at the time points, respectively, and only stores the part of the action video with the time stamps. Conversely, since the Object 1 does not move at other time points, the electronic device may not store the action video without a time stamp to avoid increasing file capacity and achieve the purpose of reducing file capacity and optimizing performance.

After step S520, the electronic device may upload the course data package to a server for other learners to download. Other learners may download the course data package from the server, load the course data package through an electronic device, and play the animation package included in the course data package to replay the actions of the teacher manipulating the objects in virtual reality.

In one embodiment, before playing the animation package, the electronic device may first put the animation package including the action videos into an object pool. The electronic device may then determine whether an action frame of the action videos has the same first object as an action frame to be played. When the action frame and the action frame to be played have the same first object, the first object of the action frame is reserved in the object pool to achieve a low-delay and high-speed playback mode.

Figure 8:
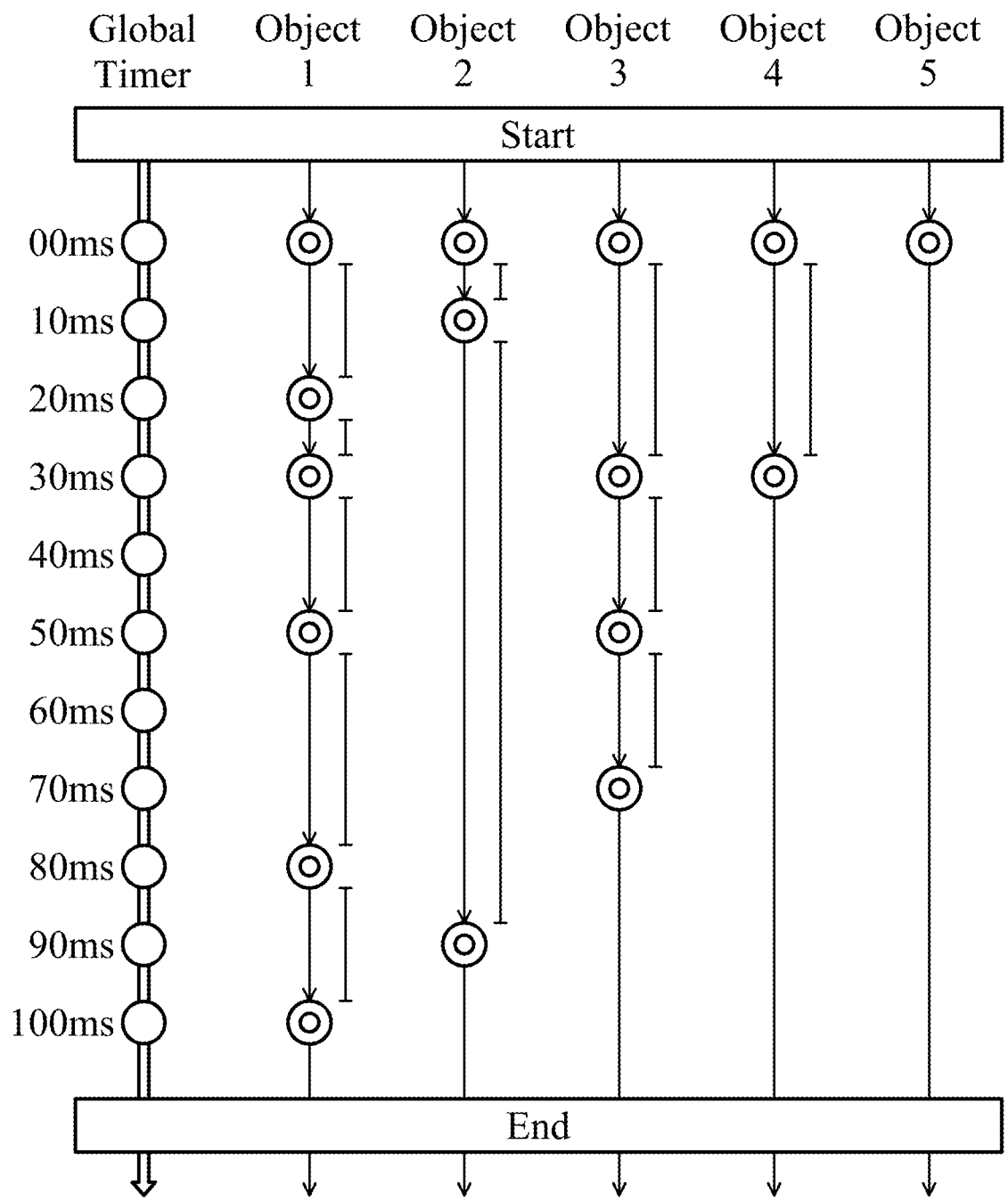
FIG. 8 is a schematic diagram illustrating the electronic device playing the action videos with the time stamps according to an embodiment of the disclosure.

FIG. 8 is a schematic diagram illustrating the electronic device playing the action videos with the time stamps according to an embodiment of the disclosure. Similar to FIG. 7, it is assumed that the 3D model has five objects, namely Object 1 to Object 5. The electronic device may directly play the coordinate rotation information and displacement information of Object 1 to Object 5 at the corresponding time stamps (mark ⊚). For example, the time stamps of the action video of Object 2 are respectively at the time points of 00 ms, 10 ms, and 90 ms. When the time of the global timer of the electronic device is 00 ms, 10 ms, and 90 ms, the electronic device may play the coordinate rotation information and displacement information of the corresponding time stamps (mark ⊚).

Figure 9A:
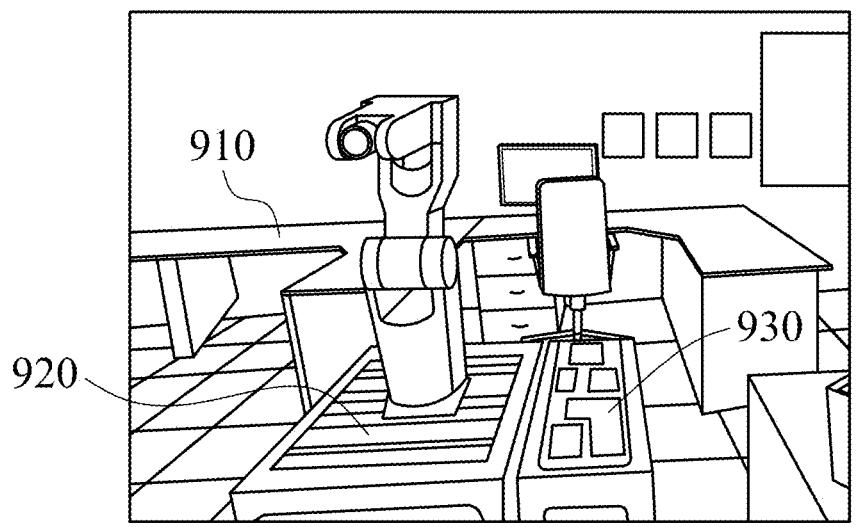
FIGS. 9A-9D are schematic diagrams illustrating six different types of objects according to an embodiment of the present disclosure.
Figure 9B:
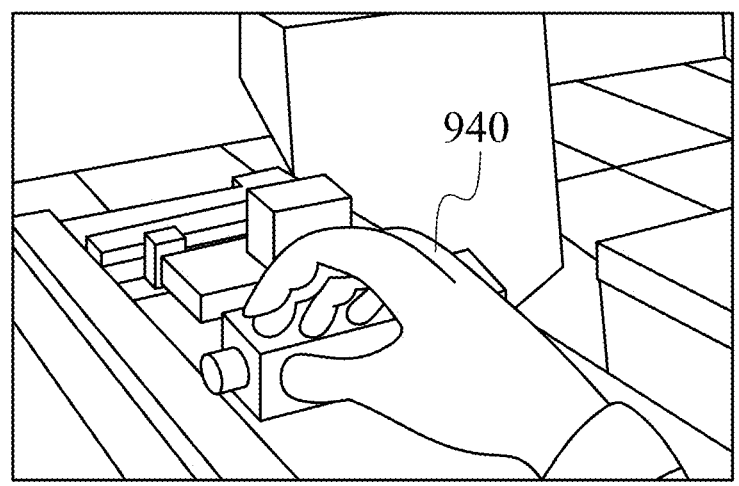
Figure 9C:
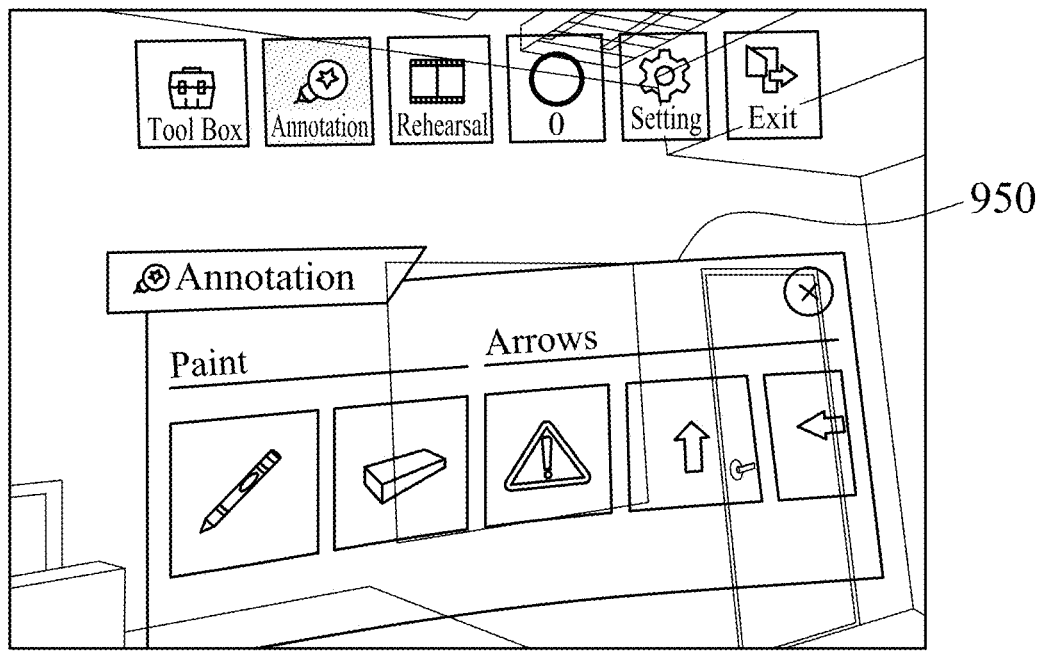
Figure 9D:
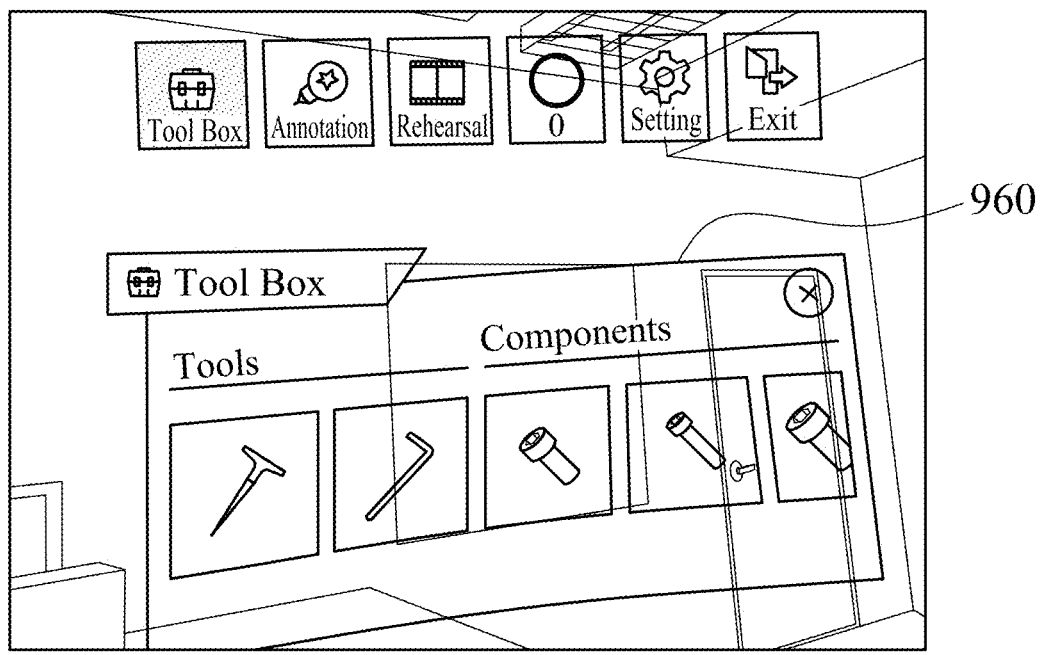

FIGS. 9A~9D are schematic diagrams illustrating six different types of objects according to an embodiment of the present disclosure. FIGS. 9A~9D illustrate the assembly of a machine as an example. As shown in FIG. 9A, the electronic device generates an environment 910 (a pure collision object), a cabinet 920 (a base object), and an assembly object 930 (a physical object). As shown in FIG. 9B, the electronic device generates a VR handle 940 (an extraction object). As shown in FIG. 9C, the electronic device generates a marking object 950 (a penetrating object). As shown in FIG. 9D, the electronic device generates a hand tool 960 (a physical object with gravity ignored). The user records the action videos of the objects in virtual reality.

Figure 10:
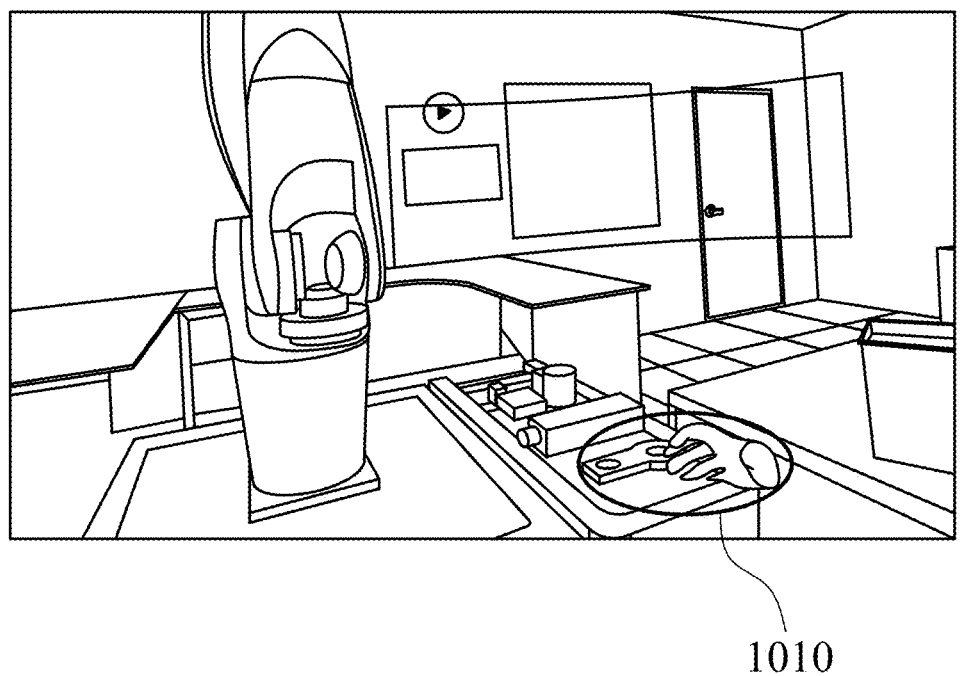
FIG. 10 is a schematic diagram illustrating that the course data package is played according to an embodiment of the present disclosure.

FIG. 10 is a schematic diagram illustrating that the course data package is played according to an embodiment of the present disclosure. As shown in FIG. 10, the circled part 1010 is the movement of the user playing the course data package. The electronic device may also perform playback functions such as fast forwarding or rewinding action videos.

Figure 11:
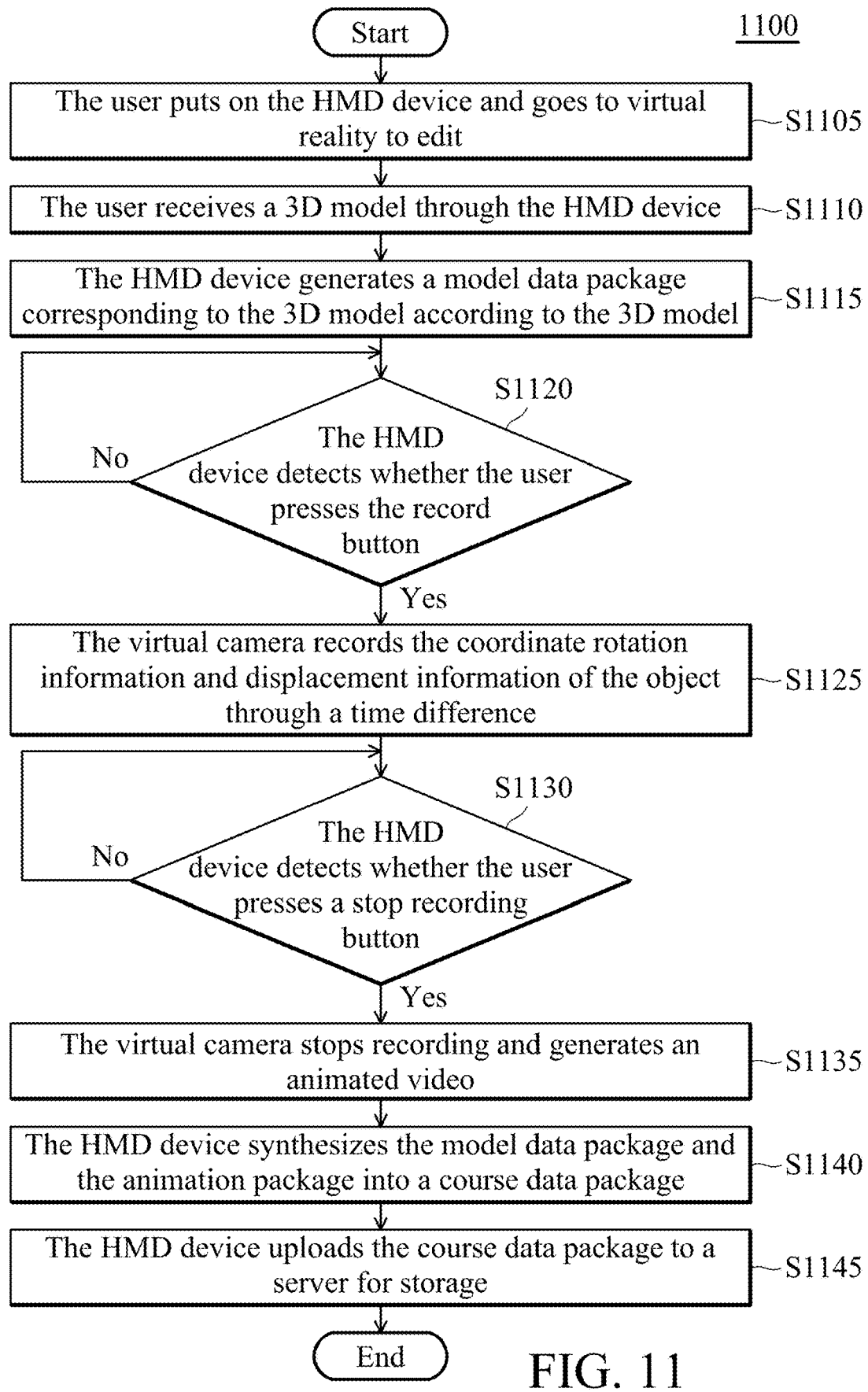
FIG. 11 is a flowchart 1100 illustrating the user producing a course data package according to an embodiment of the present disclosure.

FIG. 11 is a flowchart 1100 illustrating the user producing a course data package according to an embodiment of the present disclosure. In step S1105, the user puts on the HMD device and goes to virtual reality to edit. In step S1110, the user receives a 3D model through the HMD device. In step S1115, the HMD device generates a model data package corresponding to the 3D model according to the 3D model, wherein the model data package at least includes several objects applied to the 3D model (in this step, a virtual camera will be placed on each object).

Then, in step S1120, the HMD device detects whether the user presses the record button. When the HMD device detects that the user presses the record button ("Yes" in step S1120), in step S1125, the virtual camera records the coordinate rotation information and displacement information of the object through a time difference. When the HMD device does not detect that the user presses the record button ("No" in step S1120), the process returns to step S1120, and the HMD device continues to detect whether the user presses the record button.

Next, in step S1130, the HMD device detects whether the user presses a stop recording button. When the HMD device detects that the user presses the stop recording button ("Yes" in step S1130), in step S1135, the virtual camera stops recording and generates an animated video. When the HMD device does not detect that the user presses the stop recording button ("No" in step S1130), the process returns to step S1130, and the HMD device continues to detect whether the user presses the stop recording button.

In step S1140, the HMD device synthesizes the model data package and the animation package into a course data package. In step S1145, the HMD device uploads the course data package to a server for storage.

Figure 12:
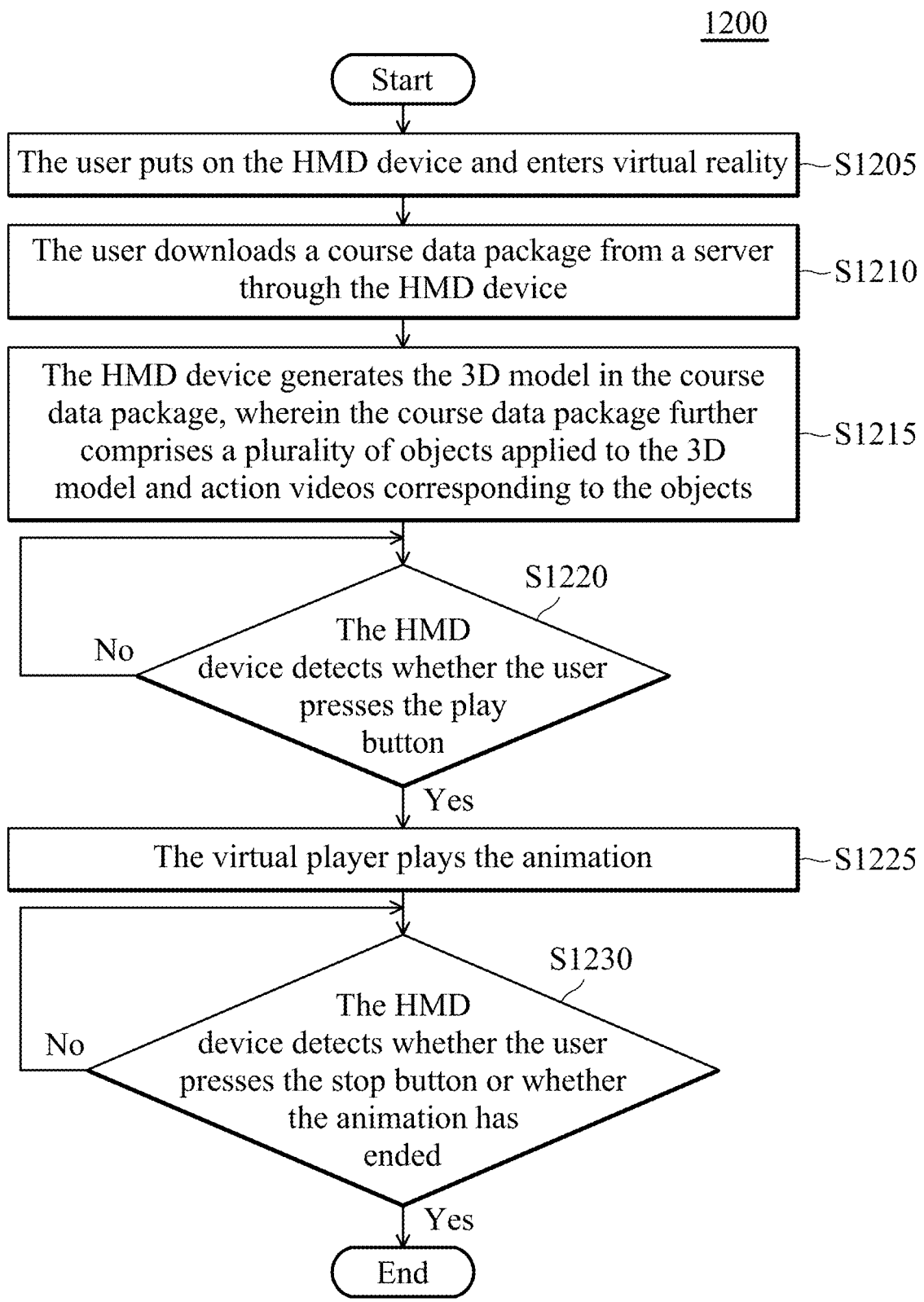
FIG. 12 is a detailed flowchart illustrating the user replaying the course data package according to an embodiment of the present disclosure.

FIG. 12 is a detailed flowchart 1200 illustrating the user replaying the course data package according to an embodiment of the present disclosure. In step S1205, the user puts on the HMD device and enters virtual reality. In step S1210 the user downloads a course data package from a server through the HMD device. In step S1215, the HMD device generates the 3D model in the course data package, wherein the course data package further includes several objects applied to the 3D model and action videos corresponding to the objects (in this step, the virtual player will be placed on each object).

Then, in step S1220, the HMD device detects whether the user presses the play button. When the HMD device detects that the user presses the play button ("Yes" in step S1220), in step S1225, the virtual player plays the animation. When the HMD device does not detect that the user presses the play button ("No" in step S1220), the process returns to step S1220, and the HMD device continues to detect whether the user presses the play button.

Next, in step S1230, the HMD device detects whether the user presses the stop button or whether the animation has ended. When the HMD device detects that the user presses the stop button or the animation has ended ("Yes" in step S1230), the process ends. When the HMD device detects that the user has not pressed the stop button or the animation has not ended ("No" in step S1230), the HMD device continues to detect whether the user has pressed the stop button or whether the animation has ended.

The method for producing and replaying courses based on virtual reality and system thereof disclosed in this disclosure may capture the movements of body and hands of the teacher. The learner may see the key movements of the hand from the perspective of the teacher viewing the object when the video is replayed.

Not only the sequence of steps for manipulating object is recorded in the present disclosure, but also the movement for manipulating object is recorded. Therefore, the learner may see the movement of the teacher and the movement track of the object in virtual reality. Learners are free to explore and learn from various angles, or watch and do. Learners may freely choose to watch certain steps, so the method for producing and replaying courses based on virtual reality and system thereof improves their learning efficiency.

In addition, since the course data package disclosed in the present disclosure is an AssetBundle file, all files in the course data package may be read by multiple platforms. Furthermore, because the Unity3D engine is used in the present disclosure, the electronic device only needs to load various virtual-reality development kits (SDKs) in the process of producing the course data package, such as AR Foundation, Vuforia, AR Kit, AR Core, to present various virtual reality effects, such as, World Tracking, Plane Detection, Object Tracking, Image Tracking, etc.

Having described embodiments of the present disclosure, an exemplary operating environment in which embodiments of the present disclosure may be implemented is described below. Referring to FIG. 13, an exemplary operating environment for implementing embodiments of the present disclosure is shown and generally known as a computing device 1300. The computing device 1300 is merely an example of a suitable computing environment and is not intended to limit the scope of use or functionality of the disclosure. Neither should the computing device 1300 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 13, the computing device 1300 may include a bus 1310 that is directly or indirectly coupled to the following devices: one or more memories 1312, one or more processors 1314, one or more display components 1316, one or more input/output (I/O) ports 1318, one or more input/output components 1320, and an illustrative power supply 1322. The bus 1310 may represent one or more kinds of busses (such as an address bus, data bus, or any combination thereof). Although the various blocks of FIG. 13 are shown with lines for the sake of clarity, and in reality, the boundaries of the various components are not specific. For example, the display component such as a display device may be considered an I/O component and the processor may include a memory.

The computing device 1300 typically includes a variety of computer-readable media. The computer-readable media can be any available media that can be accessed by computing device 1300 and includes both volatile and nonvolatile media, removable and non-removable media. By way of example, not limitation, computer-readable media may include computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 1300. The computer storage media may not include signals per se.

The communication media typically embodies computer-readable instructions, data structures, program modules or other data in a modulated data signal such as a carrier wave or other transport mechanism and includes any information delivery media. The terra "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 1312 may include computer-storage media in the form of volatile and/or nonvolatile memory. The memory may be removable, non-removable, or a combination thereof. Exemplary hardware devices include solid-state memory, hard drives, optical-disc drives, etc. The computing device 1300 includes one or more processors that read data from various entities such as the memory 1312 or the I/O components 1320. The display component(s) 1316 present data indications to a user or to another device. Exemplary presentation components include a display device, speaker, printing component, vibrating component, etc.

The I/O ports 1318 allow the computing device 1300 to be logically coupled to other devices including the I/O components 1320, some of which may be embedded. Illustrative components include a microphone, joystick, game pad, satellite dish, scanner, printer, wireless device, etc. The I/O components 1320 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 1300, or any combination thereof. The computing device 1300 may be equipped with depth cameras, such as stereoscopic camera systems, infrared camera systems, RGB camera systems, or any combination thereof, to realize gesture detection and recognition. Furthermore, the computing device 1300 may be equipped with accelerometers or gyroscopes that enable detection of motion. The output of the accelerometers or gyroscopes may be provided to the display of the computing device 1300 to carry out immersive augmented reality or virtual reality.

Furthermore, the processor 1314 in the computing device 1300 can execute the program code in the memory 1312 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for producing and replaying courses based on virtual reality, used in an electronic device, comprising steps of:
   receiving, by a processor of the electronic device, a 3D model;
   generating, by the processor, a model data package according to the 3D model, wherein the model data package at least comprises a plurality of objects applied to the 3D model;
   capturing, by a plurality of virtual cameras, an image of actions performed by a user who manipulates the objects in virtual reality, and generating action videos corresponding to the objects;
   generating, by the processor, a course data package, wherein the course data package comprises the model data package and an animation package comprising action videos;
   loading, by the processor, the course data package; and
   playing, by the processor, the animation package comprised in the course data package to replay the actions of the user manipulating the objects in virtual reality.

2. The method for producing and replaying courses based on virtual reality as claimed in claim 1, wherein the objects are classified into pure collision objects, base objects, extraction objects, physical objects, penetrating objects, and physical objects with gravity ignored.

3. The method for producing and replaying courses based on virtual reality as claimed in claim 1, wherein the virtual cameras record coordinate rotation information and displacement information of the objects through a time difference.

4. The method for producing and replaying courses based on virtual reality as claimed in claim 1, wherein after recording the actions of the user who manipulates the objects in virtual reality, the method further comprises steps of:
   determining whether the objects move;
   marking the action videos with time stamps when an object moves; and
   storing the action videos marked with time stamps.

5. The method for producing and replaying courses based on virtual reality as claimed in claim 1, wherein the step of playing the animation package comprised in the course data package further comprises steps of:
   putting the animation package comprising the action videos into an object pool;
   determining whether an action frame of the action videos has the same first object as an action frame to be played; and
   reserving the first object of the action frame in the object pool when the action frame and the action frame to be played have the same first object.

6. The method for producing and replaying courses based on virtual reality as claimed in claim 1, further comprising a step of:
   creating virtual reality with a Unity3D engine.

7. The method for producing and replaying courses based on virtual reality as claimed in claim 6, wherein the course data package is an AssetBundle file.

8. The method for producing and replaying courses based on virtual reality as claimed in claim 1, wherein the animation package comprises at least one audio file, a preloaded object-and-animation matching file, animation information corresponding to the objects, a screenshot of the animation package or combination thereof.

9. The method for producing and replaying courses based on virtual reality as claimed in claim 1, wherein the electronic device is a head-mounted display (HMD) device.

10. A system for producing and replaying courses based on virtual reality, comprising:
    one or more processors; and
    one or more computer storage media for storing one or more computer-readable instructions, wherein the processor is configured to drive the computer storage media to execute the following tasks of:
    receiving a 3D model;
    generating a model data package according to the 3D model, wherein the model data package at least comprises a plurality of objects applied to the 3D model;
    capturing, by a plurality of virtual cameras, an image of actions performed by a user who manipulates the objects in virtual reality, and generating action videos corresponding to the objects;
    generating a course data package, wherein the course data package comprises the model data package and an animation package comprising action videos;
    loading the course data package; and
    playing the animation package comprised in the course data package to replay the actions of the user manipulating the objects in virtual reality.

11. The system for producing and replaying courses based on virtual reality as claimed in claim 10, wherein the objects are classified into pure collision objects, base objects, extraction objects, physical objects, penetrating objects, and physical objects with gravity ignored.

12. The system for producing and replaying courses based on virtual reality as claimed in claim 10, wherein the virtual cameras record coordinate rotation information and displacement information of the objects through a time difference.

13. The system for producing and replaying courses based on virtual reality as claimed in claim 10, wherein after recording the actions of the user who manipulates the objects in virtual reality, the processor further executes the following tasks of:
    determining whether the objects move;
    marking the action videos with time stamps when an object moves; and
    storing the action videos marked with time stamps.

14. The system for producing and replaying courses based on virtual reality as claimed in claim 10, wherein the task of playing the animation package comprised in the course data package further comprises tasks of:
    putting the animation package comprising the action videos into an object pool;
    determining whether an action frame of the action videos has the same first object as an action frame to be played; and
    reserving the first object of the action frame in the object pool when the action frame and the action frame to be played have the same first object.

15. The system for producing and replaying courses based on virtual reality as claimed in claim 10, wherein the processor further executes the following task of:
    creating virtual reality with a Unity3D engine.

16. The system for producing and replaying courses based on virtual reality as claimed in claim 15, wherein the course data package is an AssetBundle file.

17. The system for producing and replaying courses based on virtual reality as claimed in claim 10, wherein the animation package comprises at least one audio file, a preloaded object-and-animation matching file, animation information corresponding to the objects, a screenshot of the animation package or combination thereof.

18. The system for producing and replaying courses based on virtual reality as claimed in claim 10, wherein the electronic device is a head-mounted display (HMD) device.

* * * * *